(12) United States Patent
Tanis et al.

(10) Patent No.: US 7,397,827 B2
(45) Date of Patent: Jul. 8, 2008

(54) SYSTEMS AND METHODS FOR SWITCHING MULTI-RATE COMMUNICATIONS

(75) Inventors: Terrence J. Tanis, Chicago, IL (US); Ravi Chandran, Naperville, IL (US); Daniel J. Marchok, Buchanan, MI (US)

(73) Assignee: Tellabs Operations, Inc., Naperville, IL (US)

( * ) Notice: Subject to any disclaimer, the term of this patent is extended or adjusted under 35 U.S.C. 154(b) by 820 days.

(21) Appl. No.: 10/733,962

(22) Filed: Dec. 11, 2003

(65) Prior Publication Data

US 2004/0120360 A1 Jun. 24, 2004

Related U.S. Application Data

(60) Provisional application No. 60/432,501, filed on Dec. 11, 2002.

(51) Int. Cl.
H04J 3/02 (2006.01)
H04L 12/50 (2006.01)

(52) U.S. Cl. .......................... 370/538; 370/370
(58) Field of Classification Search ................ None
See application file for complete search history.

(56) References Cited

U.S. PATENT DOCUMENTS

| | | | |
|---|---|---|---|
| 6,356,550 B1 * | 3/2002 | Williams | 370/364 |
| 6,604,870 B2 | 8/2003 | Horlyck | |
| 6,606,297 B1 | 8/2003 | Magill et al. | |
| 6,614,907 B1 | 9/2003 | Laberteaux et al. | |
| 6,628,651 B1 | 9/2003 | Ryan et al. | |
| 6,693,915 B1 * | 2/2004 | Lappetelainen et al. | 370/468 |
| 7,145,867 B2 * | 12/2006 | Aicklen et al. | 370/228 |
| 2001/0033569 A1 * | 10/2001 | Dally | 370/369 |
| 2001/0050914 A1 * | 12/2001 | Akahane et al. | 370/382 |
| 2003/0223568 A1 * | 12/2003 | Eyeson et al. | 379/220.01 |
| 2004/0001454 A1 * | 1/2004 | Boily | 370/314 |

* cited by examiner

Primary Examiner—Kwang B. Yao
Assistant Examiner—Jutai Kao
(74) Attorney, Agent, or Firm—Lawrence Cho; Dean D. Small; Small Patent Law Group

(57) ABSTRACT

A method for switching multi-rate communications is described. The method includes filling a first set of p timeslots with p sets of data from a first data collection of a first type, where the first data collection includes m sets of data and p is less than m. The method also includes loading at least one overflow timeslot with at least one overflow set of data from the first data collection, where the overflow set of data exceeds a size of the first set of p timeslots.

19 Claims, 10 Drawing Sheets

SYSTEMS AND METHODS FOR SWITCHING MULTI-RATE COMMUNICATIONS

CROSS REFERENCE TO RELATED APPLICATIONS

This application claims the priority of U.S. Provisional Patent Application having Ser. No. 60/432,501 and filed on Dec. 11, 2002, which is hereby incorporated by referenced in its entirety.

BACKGROUND OF THE INVENTION

This invention relates generally to switching of data in communications and more particularly to systems and methods for switching multi-rate communications.

In telecommunications, there are a number of standard frame formats which are built from successive combinations of fundamental 64 kilobits/second (KBit/sec.) channels, referred to as communications. One such format is SONET (Synchronous Optical Network) which creates 125 us frames containing virtual tributary (VT) positions, referred to as VTs. A SONET frame includes a limited number of timeslots. The size of the VTs depends on an underlying communication being transported within a SONET frame. Examples of VT sizes include VT1.5, VT2, VT3 and VT6. A VT1.5 can be divided into three equally sized portions, each of which can be called a VT0.5.

A modified version of a SONET STS-1 frame is a system data format (SDF) frame. Within the SDF frame, there are modified versions of VTs. The modified versions are referred to as T virtual tributaries (TVTs). Within the SONET STS-1 frame, VTs are used, and within an SDF frame, TVTs are used. A TVT is equivalent to a VT. Examples of TVT sizes include TVT0.5, TVT1.5, TVT2, TVT3 and TVT6. A DS1 communication occupies 3 TVT0.5s. An E1 communication occupies 4 TVT0.5s and occupies a set of timeslots, such as, for example, columns, n, n+24, n+48, and n+72, within an SDF frame.

A switch fabric that includes cascading time and space switch elements manipulate VTs contained within a SONET frame. For manipulating the VTs, any VT in a SONET frame that is input to the switch fabric should be mapped to any same-sized VT in a SONET frame output from the switch fabric. Examples of configurations of the switch fabric include a T-S-T configuration and a T-S-S-S-T configuration, where T represents a timeslot interchange and S represents a space switch.

Some switch fabrics typically do not support different types of communications in an efficient manner. For example, a switch fabric that has a T-S-T configuration optimized to support a single communication type, may not support mixed DS1 and E1 communications without blocking the E1 and DS1 communications during transit. In the example, although the DS1 and E1 communications may transit through the left timeslot interchange T within the T-S-T configuration, a set of timeslots within the space switch S may not be empty to channel the DS1 and E1 communications. In such a case, the DS1 and E1 communications are blocked until the set of timeslots within the space switch S becomes empty.

Moreover, some switch fabrics cannot handle different types of communications without replacing hardware, such as timeslot interchanges and space switches, within the switch fabrics. For example, if a switch fabric includes timeslot interchanges that support VT1.5s, the switch fabric cannot support an E1 communication without replacing the timeslot interchanges with timeslot interchanges that support VT2s.

BRIEF DESCRIPTION OF THE INVENTION

In one embodiment, a method for switching multi-rate communications is described. The method includes filling a first set of p timeslots with p sets of data from a first data collection of a first type, where the first data collection includes m sets of data and p is less than m. The method also includes loading at least one overflow timeslot with at least one overflow set of data from the first data collection, where the overflow set of data exceeds a size of the first set of p timeslots.

In another embodiment, a method for switching multi-rate communications is provided. The method includes filling a first set of p timeslots with p sets of data of a first data collection, a second set of p timeslots with p sets of data of a second data collection, and a third set of p timeslots with p sets of data of a third data collection, where each of the first, the second, and the third data collection are of a common first type, each of the first, the second, and the third data collection include m sets of data, and p is less than m. The method also includes loading a fourth set of p timeslots with an mth set of data of the first data collection, an mth set of data of the second data collection, and an mth set of data of the third data collection.

In yet another embodiment, a system for switching multi-rate communications is provided. The system includes a time-space switch element configured to receive at least a first data collection having a common first type, where the first data collection includes m sets of data. The system also includes a buffer from which p sets of data of the first data collection are communicated to a first set of p timeslots and from which at least one overflow set of data from the first data collection is communicated to at least one overflow timeslot, where p is less than m.

DETAILED DESCRIPTION OF THE INVENTION

Figure 1:
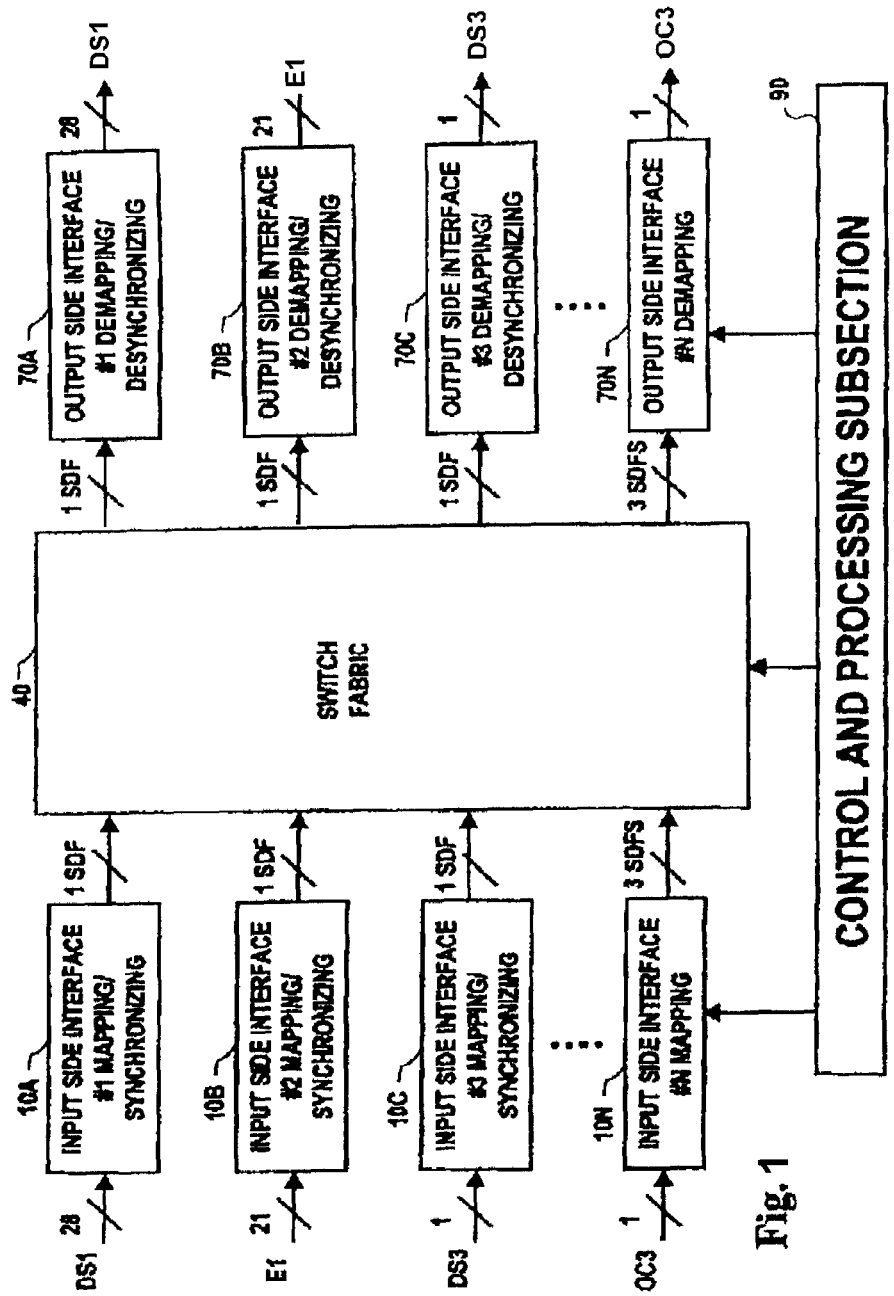
FIG. 1 illustrates a system for switching multi-rate communications in accordance with an embodiment of the invention.

FIG. 1 illustrates an embodiment of a system for switching multi-rate communications. The system includes a plurality of input side interfaces 10A-10N, a plurality of output side interfaces 70A-70N, a switch fabric 40, and a control and processing subsection 90. The input side interfaces 10A-10N interface DS1, E1, DS3, STS-1E (not shown), OC-3, OC-12 (not shown) in an inbound direction. The input side interfaces 10A-10N synchronize asynchronous payloads to generate synchronous payloads and map/multiplex the synchronous payloads into the system's data format (SDF) frame, which interfaces the switch fabric 40. As an example, one of the input side interfaces 10A-10N maps an E1 communication into columns n, n+24, n+48, and n+72, of a 96×9 SDF frame described below.

The plurality of output side interfaces 70A-70N interface DS1, E1, DS3, STS-1E (not shown), OC-3, OC-12 (not shown) in an outbound direction. The output side interfaces 70A-70N demap/demultiplex SDF frames output from the switch fabric 40 and desynchronize the synchronous payloads for transport on asynchronous facilities. The output side interfaces 70A-70N convert the outputs from switch fabric 40 into formats originally received at the inputs to the input side interfaces 10A-10N. As an example, one of the output side interfaces 70A-70N demaps columns n, n+24, n+48, and n+72, of a 96×9 SDF frame described below, into an E1 communication.

The switch fabric 40 includes time and space switching elements, arranged in a particular configuration, to support a non-blocking operation, where each virtual tributary (VT) of a given size is guaranteed to be able to connect to any free output VT of the same size. An example of the switch fabric 40 is a T-S-T architecture, where the signals pass through a total of three stages, the first and last of which are time switched, and the middle of which is space switched. Another example of the switch fabric 40 is a T-S-S-S-T configuration, which includes three stages of space switching. Another example of the switch fabric 40 is a T-S-T, which include multiple stages of space switching.

The control and processing subsection 90 performs all control, processing and communication of instructions to the plurality of input side interfaces 10A-10N, the plurality of output side interfaces 70A-70N and the switch fabric 40. The control and processing subsection 90 also includes a user interface, whereby user commands are entered and processed. The term control and processing subsection 90 as used herein refers to computers, processors, microcontrollers, microcomputers, programmable logic controllers, application specific integrated circuits, and other programmable circuits.

Figure 2:
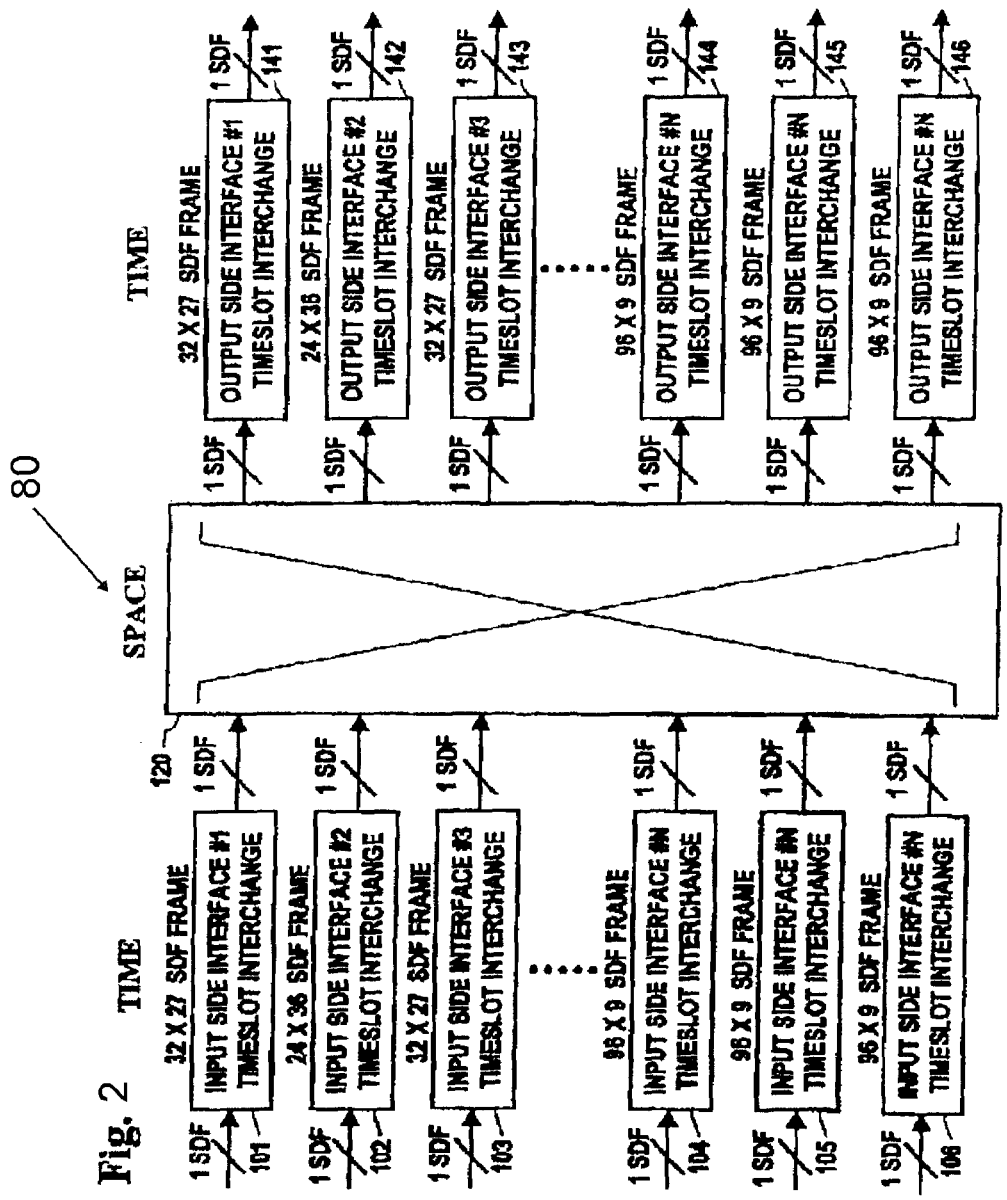
FIG. 2 illustrates a switch fabric included within the system illustrated in FIG. 1 in accordance with an embodiment of the invention.

FIG. 2 illustrates an embodiment of a switch fabric 80. The switch fabric 80 may be used to implement an embodiment of the switch fabric 40 shown in FIG. 1. The switch fabric 80 includes a plurality of input side timeslot interchanges 101-106, a plurality of output side timeslot interchanges 141-146, and a space switch 120. The plurality of input side timeslot interchanges 101-106 interface with the input side interfaces 10A-10N. The input side timeslot interchanges 101-106 reorder columns of SDF frames in a non-blocking operation so that each column of an SDF frame input to the input side timeslot interchanges 101-106 is guaranteed to be able to connect to any free column of an SDF frame output from the input side timeslot interchanges 101-106. The input side timeslot interchanges 101-106 are restricted to reordering the columns of the SDF frames over a number of columns specified within a particular SDF frame. For example, the input side timeslot interchanges 101 and 103 using a 32×27 SDF frame are restricted to reordering over 32 columns, while the input side timeslot interchanges 104-106 using a 96×9 SDF frame are restricted to reordering over 96 columns. The input side timeslot interchanges 101-106 interface with the space switch 120.

One embodiment of the system for switching multi-rate communications also provides for reordering of timeslots across two or more but not all input side timeslot interchanges 104-106. The reordering is similar to a crossbar function, described below, performed by the space switch 120. The reordering is similar in a limited sense because the reordering is not performed across all input side timeslot interchanges 104-106.

The plurality of output side timeslot interchanges 141-146 interface with the output side interfaces 70A-70N. The output side timeslot interchanges 141-146 interface with the space switch 120. The output side timeslot interchanges 141-146 reorder columns of SDF frames in a non-blocking fashion so that each column of an SDF frame input to the output side timeslot interchanges 141-146 is guaranteed to be able to connect to any free column of an SDF frame output from the output side timeslot interchanges 141-146. The output side timeslot interchanges 141-146 are restricted to reordering the columns of the SDF frames over a number of columns specified within an SDF frame being used. For example, the output side timeslot interchanges 141 and 143 using the 32×27 SDF frame are restricted to reordering over 32 columns, while the output side timeslot interchanges 144-146 using the 96×9 SDF frame are restricted to reordering over 96 columns.

Another embodiment of the system for switching multi-rate communications also provides for reordering of timeslots across two or more but not all output side timeslot interchanges 144-146. The reordering is similar to a crossbar function, described below, performed by the space switch 120. The reordering is similar in a limited sense because the reordering is not performed across all output side timeslot interchanges 144-146.

The space switch 120 performs a crossbar function by moving each column of each SDF frame input to the space switch 120 to a corresponding column of one SDF frame output from the space switch 120 or a plurality of SDFs output from the space switch 120. The space switch 120 performs the cross bar function in a non-blocking fashion so that each column on a SDF frame input to the space switch 120 is guaranteed to be able to connect to a corresponding free column on an SDF frame output from the space switch 120 or a plurality of SDF frames output from the space switch 120.

Figure 3:
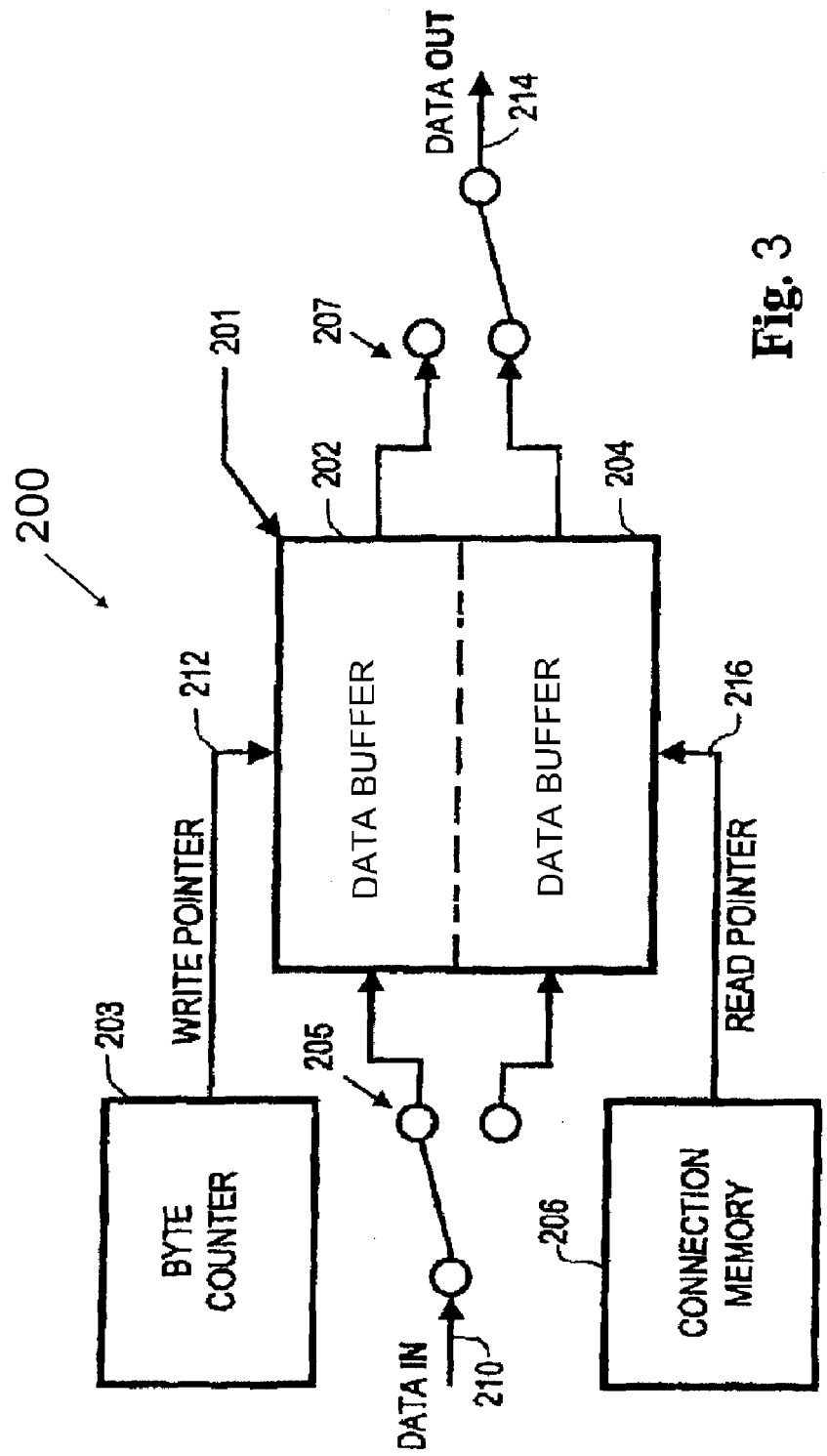
FIG. 3 illustrates a timeslot interchange included within the switch fabric illustrated in FIG. 2 in accordance with an embodiment of the invention.

FIG. 3 illustrates an embodiment of a timeslot interchange 200. The timeslot interchange 200 may be used to implement an embodiment of each of the interchanges 101-106 and 141-146 shown in FIG. 2. The timeslot interchange 200 includes a data buffer 202 forming half of a memory 201, a data buffer 204 forming another half of memory 201, a byte counter 203 and a connection memory 206. At any given time, one half of the memory 201 is allocated to the data buffer 202 and the remaining half is allocated to the data buffer 204. The data buffer 202 functions as a write-in buffer for x bytes until the buffer 202 is completely full. Then, the data buffer 202 functions as a read out buffer for x bytes, where the values stored in the memory 201 can be read out in some predetermined fashion. Switch 205 directs input data to the data buffer 202 or the data buffer 204.

Similarly, one half of the memory 201 initially allocated to the data buffer 204 functions as such for x bytes. After the x bytes of stored data have been read out from the data buffer 204, the data buffer 204 functions as a data write in buffer for x bytes. The two halves of the data memory 201 therefore alternate function every x bytes, or one row of an SDF frame. The function of reading output data from data buffer 202 or data buffer 204 is controlled by a switch 207. An order of bytes stored within and being read out of memory 201 is controlled by the connection memory 206.

Data is presented at input 210 to the data buffer 202 and is written into x successive bytes within the memory 201. A write pointer transmitted on a bus 212 by the byte counter 203 starts at byte 0 stored within the buffer 202, and is incremented once every byte time, until reaching its maximum count of bytes (x−1).

At the same time the data is presented at input 210, x bytes are output from data buffer 204 to data output 214 as directed by a read pointer transmitted on a bus 216 which is controlled by the connection memory 206. The connection memory 206 directs which of the x bytes will be output from the timeslot interchange 200 at any time. Connection memory 206 stores x connection memory addresses, one address for each byte of one row of an SDF frame. Each address stores a number of the byte to be sent at a time from the data buffer 204.

The byte counter 203 is used as a circular counter, counting times from 0 to (x−1). Upon reaching (x−1), the byte counter 203 returns to 0, and begins counting again.

Figure 4:
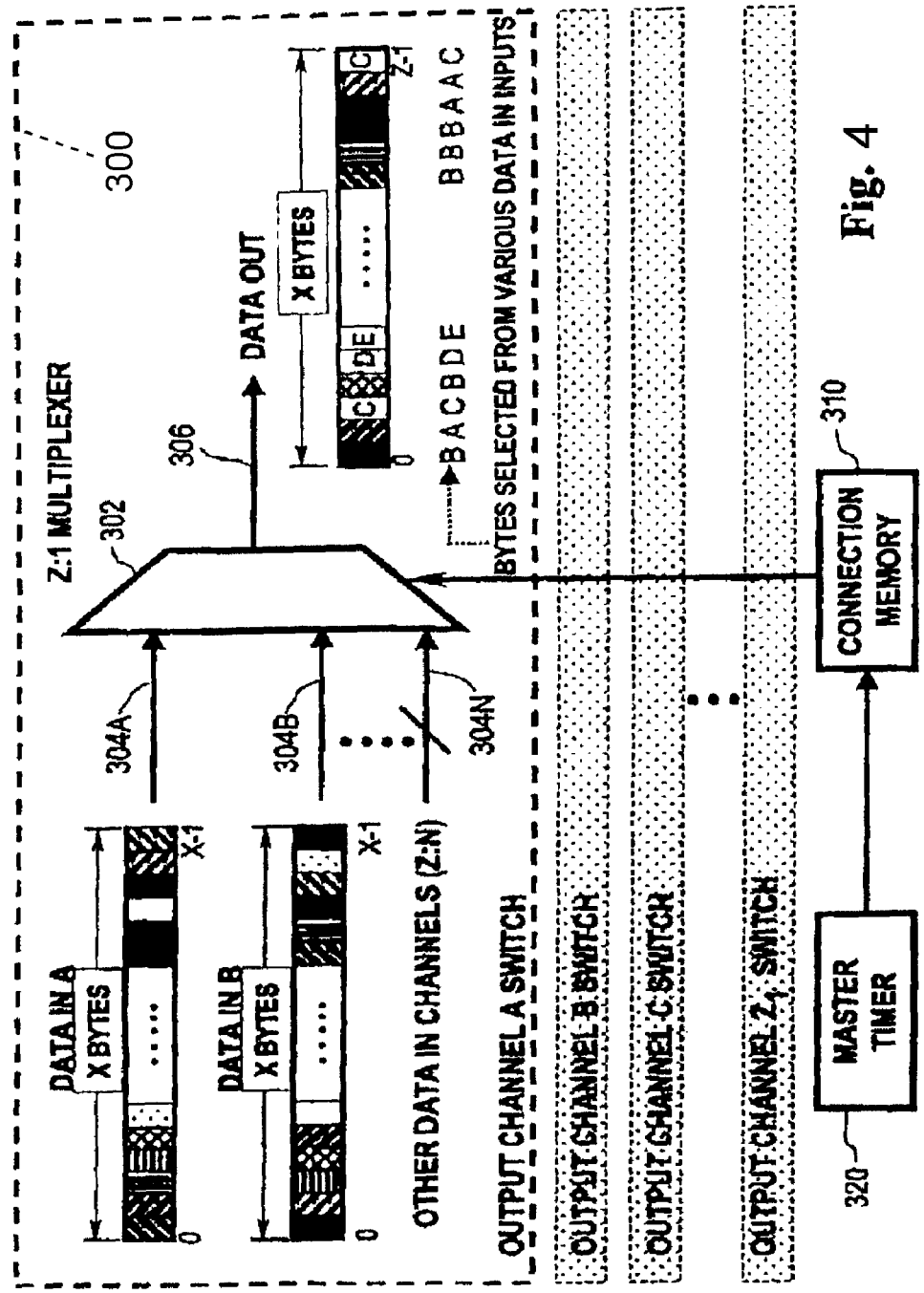
FIG. 4 illustrates a space switch included within the switch fabric illustrated in FIG. 2 in accordance with an embodiment of the invention.

FIG. 4 illustrates an embodiment of the space switch 300. The space switch 300 may be used to implement an embodiment of the space switch 120 shown in FIG. 2. The space switch 300 includes a number $Z_1$ of Z:1 multiplexers, such as a multiplexer 302, which receive data from multiple inputs, such as 304A-304N, a connection memory 310, and a master timer 320. The number $Z_1$ may or may not be equal to Z, depending on the type of a space-switch.

Every Z:1 multiplexer 302 takes in Z inputs, and produces one output on a bus, such as a bus 306. The selection of Z inputs is controlled by connection memory 310. For each time a byte is output from the Z:1 multiplexer 302, the Z:1 multiplexer 302 is updated by connection memory 310 to select data on one of inputs 304A-304N to transmit for that time.

Connection memory 310 stores x connection memory addresses, one address for each byte of one row of an SDF frame. Each connection memory address stores a number of a corresponding byte to be sent at a time a byte is output from the Z:1 multiplexer 302. The master timer 320 controls the timing of connection memory 310 so that the Z:1 multiplexer 302 accepts a byte on a boundary of a preceding byte accepted by the Z:1 multiplexer 302.

Figure 5:
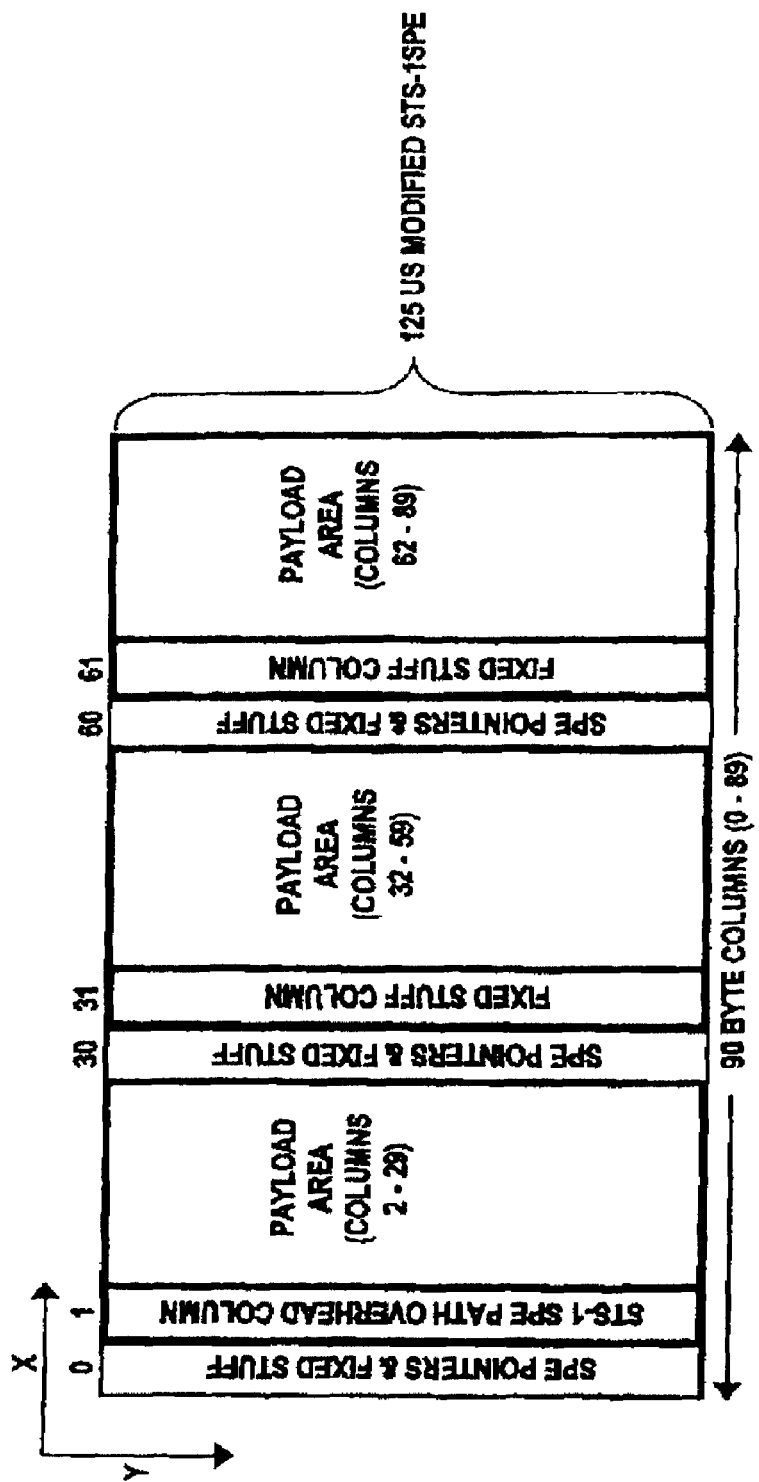
FIG. 5 illustrates a modified system data format (SDF) frame that is used by the system of FIG. 1 in accordance with an embodiment of the invention.

FIG. 5 illustrates an embodiment of a modified SDF frame. The modified SDF frame includes 90 columns used to carry an intact STS-1 synchronous payload envelope payload (STS-1 SPE payload).

Figure 6:
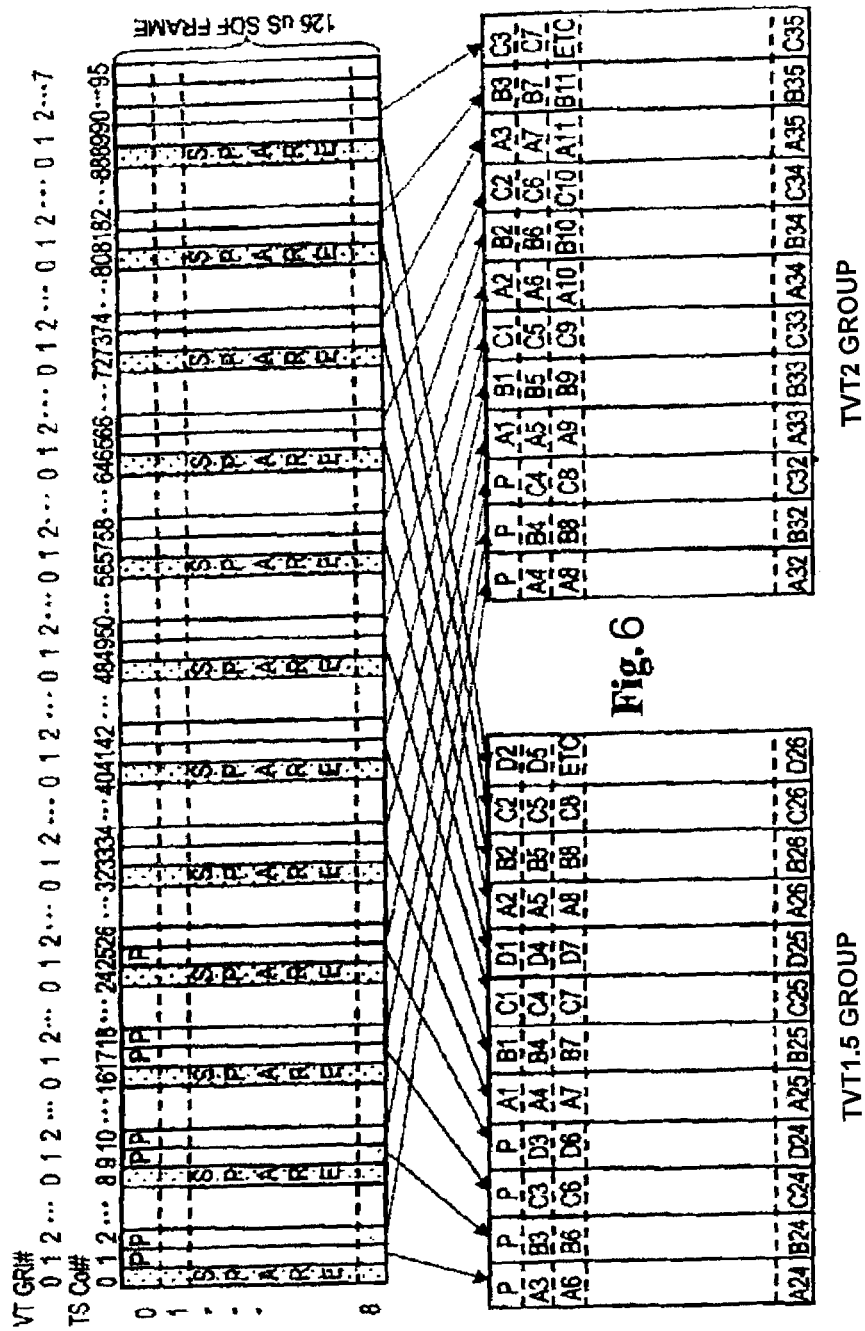
FIG. 6 illustrates a 96×9 SDF frame that is used by the system of FIG. 1 in accordance with an embodiment of the invention.
Figure 7:
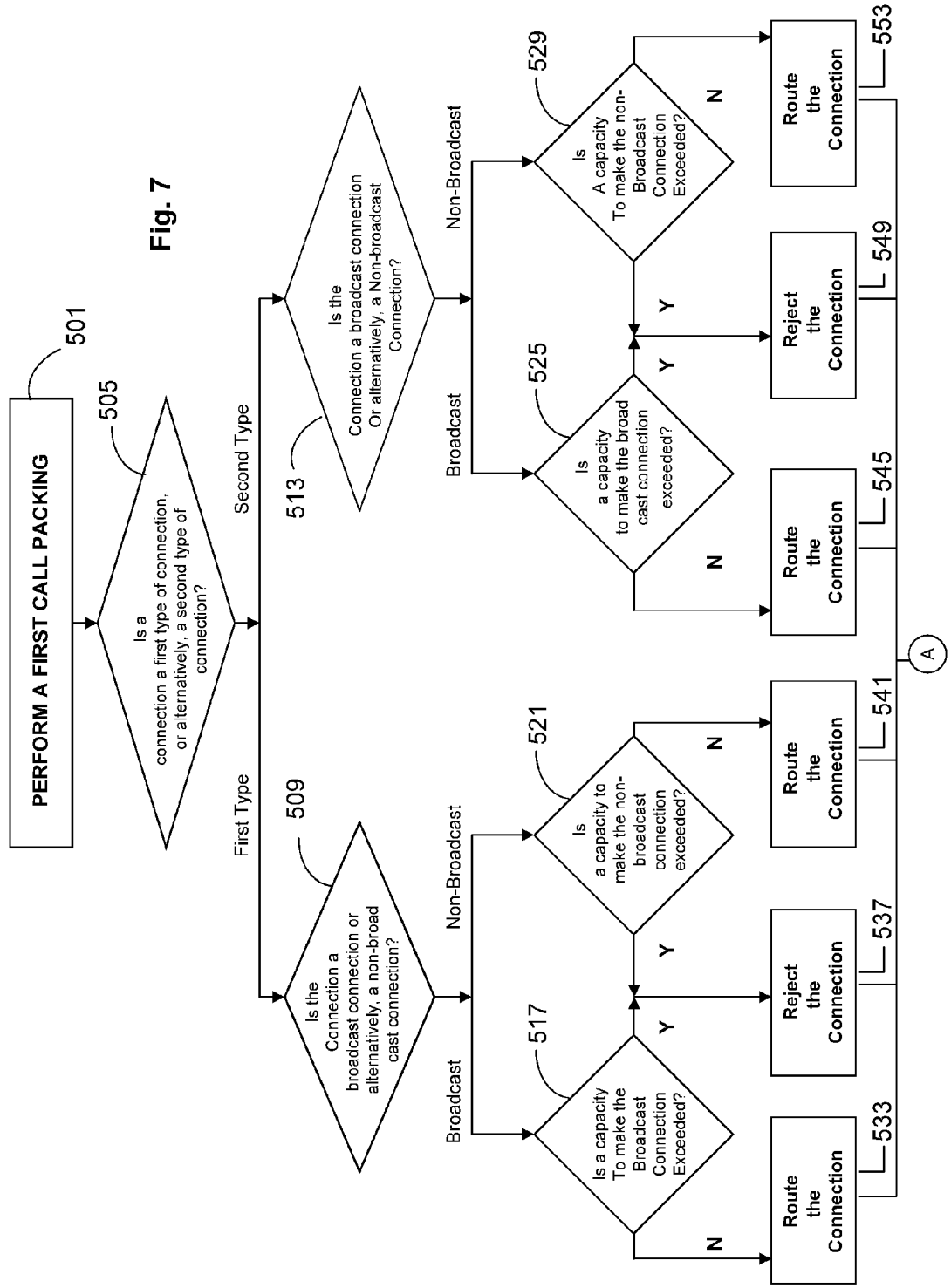
FIGS. 7-10 illustrate a flowchart of a method for switching multi-rate communications in accordance with an embodiment of the invention.
Figure 8:
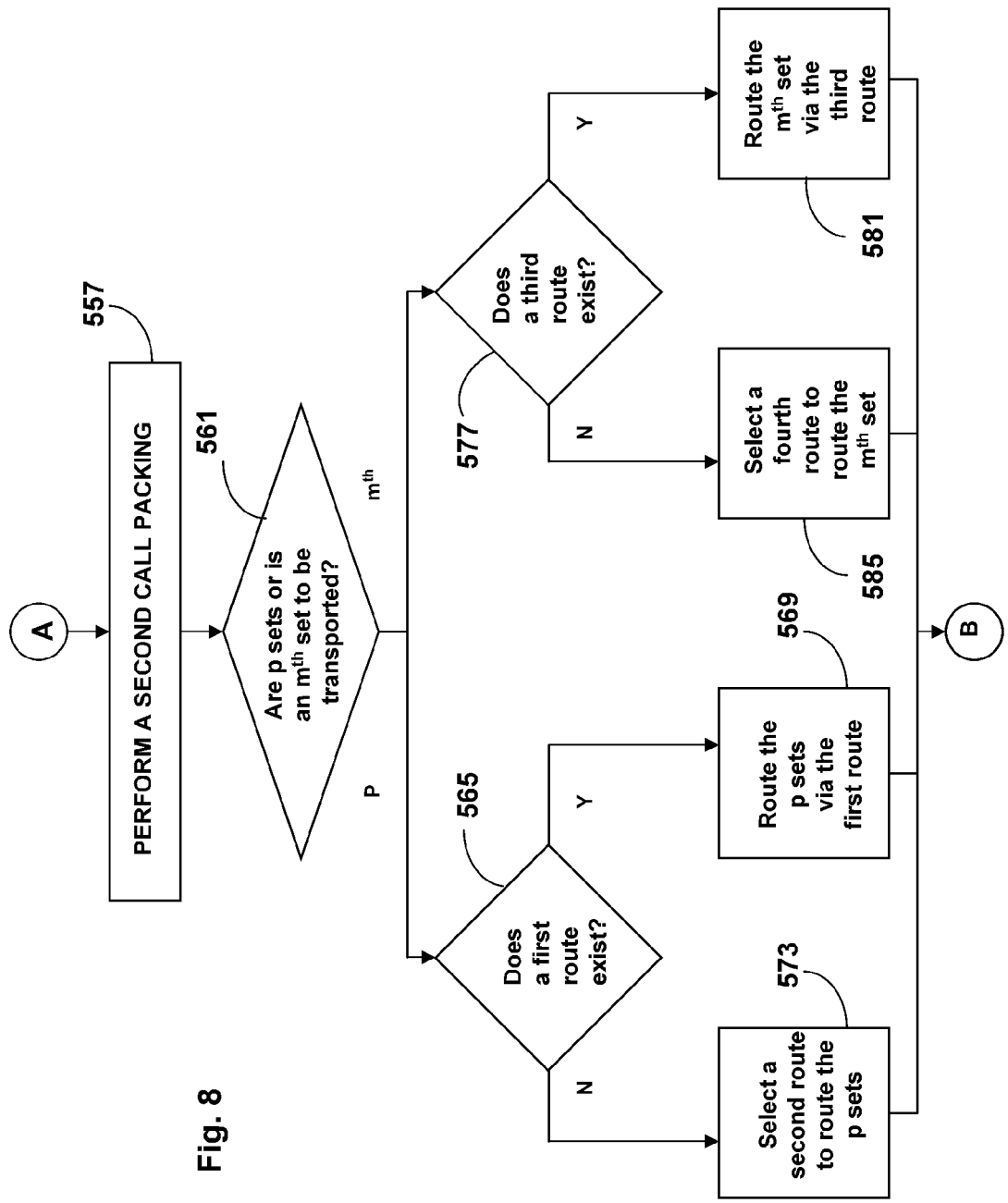
Figure 9:
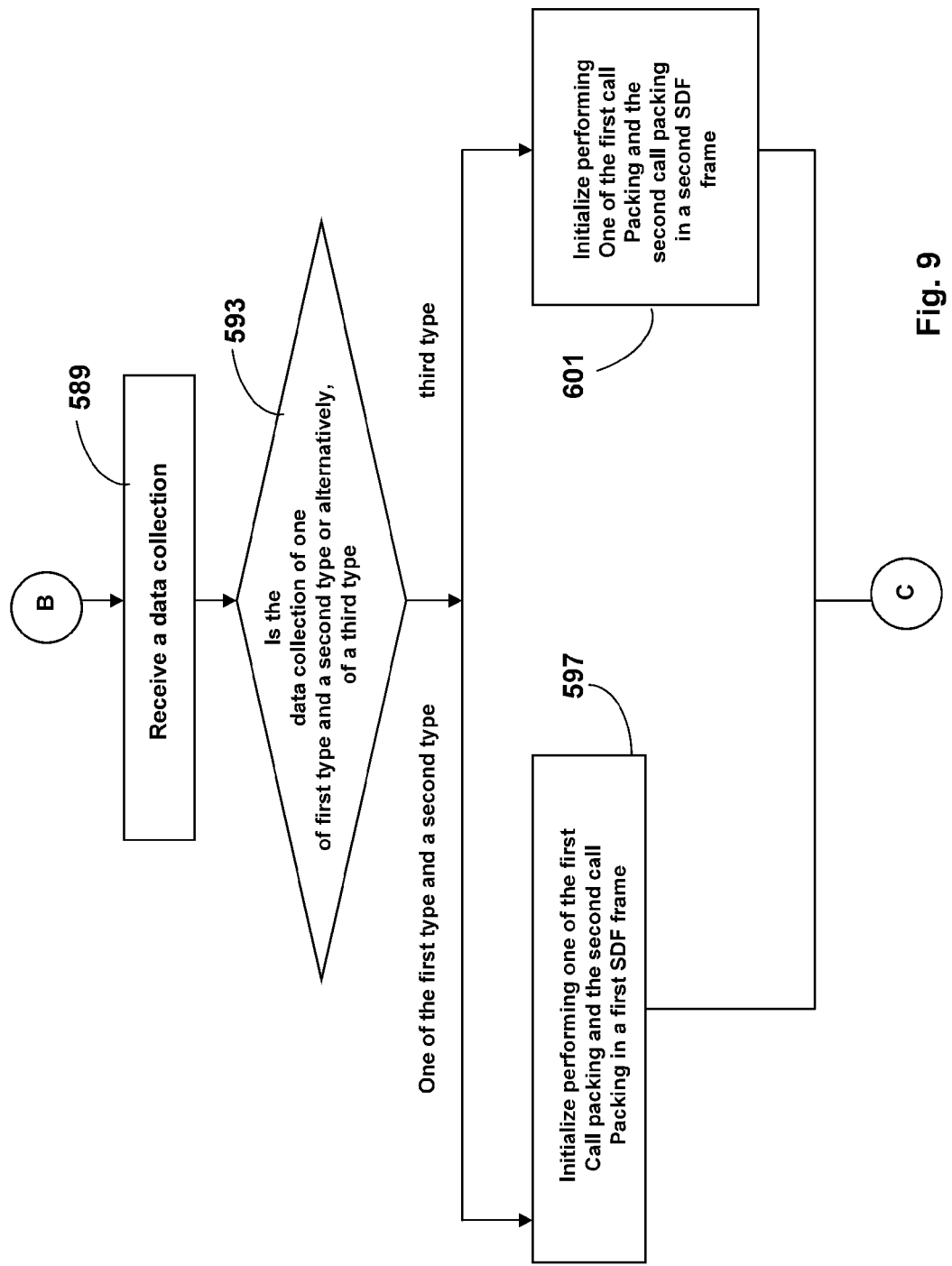
Figure 10:
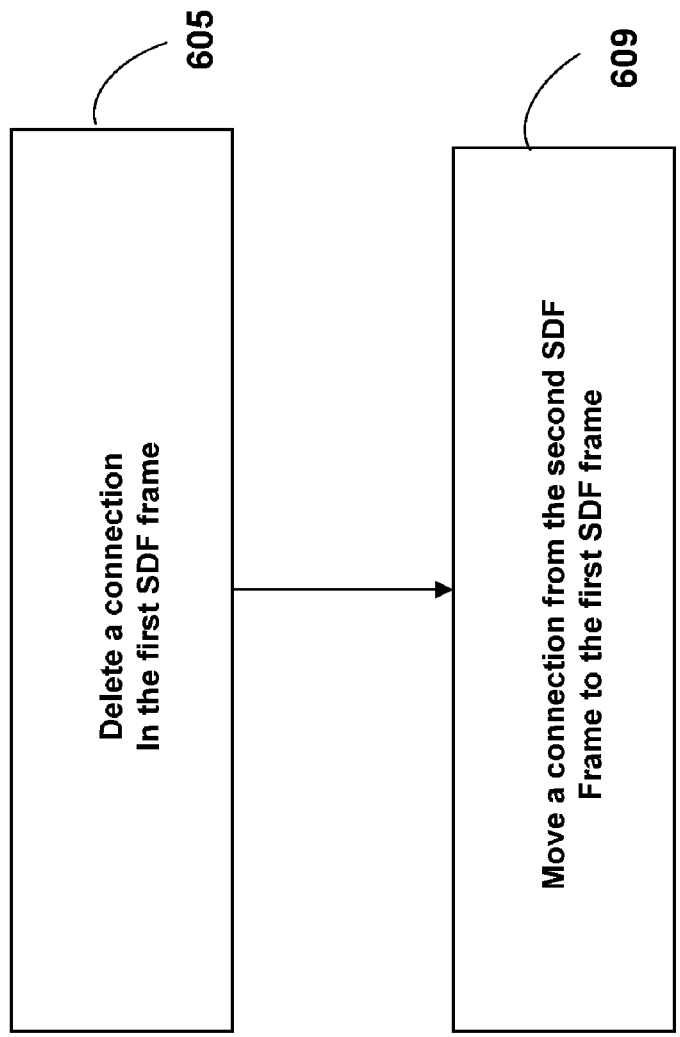

FIG. 6 illustrates an embodiment of a 96×9 SDF frame when mixed T virtual tributaries (TVTs) are mapped into one 96×9 SDF frame. A TVT is equivalent to a VT. In addition to 84 columns used for simultaneous transport of 7 TVT groups of information, 12 additional columns are added in a byte-interleaved fashion that can be used for a variety of functions. The 12 additional columns form an $8^{th}$ TVT group. In the case of an STS-1 SPE payload, the modified SDF frame of FIG. 5 is mapped into the 96×9 SDF frame and after the mapping, six timeslots within the 96×9 SDF frame are left empty.

FIGS. 7-10 are flowcharts illustrating methods for switching multi-rate communications according to embodiments of the present invention. Techniques illustrated in FIGS. 7-10, in some instances, may be performed sequentially, in parallel, or in an order other than that which is described. It should be appreciated that not all of the techniques described are required to be performed, that additional techniques may be added, and that some of the illustrated techniques may be substituted with other techniques.

In 501, a first call packing is performed. In 505, a determination, whether a connection is of a first type or of a second type, is made. Regardless of whether the connection is of the first type or the second type, in 509 and 513, a determination, whether the connection is a broadcast connection or a non-broadcast connection, is made.

If the connection is of the first type and is a broadcast connection, in 517, a determination, whether a capacity to make the connection is exceeded, is made. If the capacity is not exceeded, in 533, the connection is routed. If the capacity is exceeded, in 537, the connection is rejected.

If the connection is of the first type and a non-broadcast connection, in 521, a determination whether a capacity to make the connection is exceeded, is made. If the capacity is not exceeded, in 541, the connection is routed. If the capacity is exceeded, in 537, the connection is rejected.

If the connection is of the second type and a broadcast connection, in 525, a determination whether a capacity to make the connection is exceeded, is made. If the capacity is not exceeded, in 545, the connection is routed. If the capacity is exceeded, in 549, the connection is rejected.

If the connection is of the second type and a non-broadcast connection, in 529, a determination whether a capacity to make the connection is exceeded, is made. If the capacity is not exceeded, in 553, the connection is routed. If the capacity is exceeded, in 549, the connection is rejected.

In 557, a second call packing is performed. In 561, a determination, whether p sets or an mth set is to be transported, is made. If the p sets are to be transported, in 565, a determination, whether a first route exists, is made. If the first route exists, in 569, the p sets are routed via the first route. If the first route does not exist, in 573, a second route is selected to route the p sets.

If the mth set is to be transported, in 577, a determination, whether a third route exists, is made. If the third route exists, in 581, the mth set is routed via the third route. If the third route does not exist, in 585, a fourth route is selected to route the mth set.

In 589, a data collection is received. In 593, a determination, whether the data collection is one of the first type and a second type, or alternatively of a third type, is made. If the data collection is one of the first type and the second type, in 597, one of the first call packing and the second call packing is initialized to be performed in a first SDF frame. If the data collection is of the third type, in 601, one of the first call packing and the second call packing is initialized to be performed in a second SDF frame. In 605, a connection in the first SDF frame is deleted. In 609, a connection is moved from the second SDF frame to the first SDF frame.

Next, the method illustrated in FIGS. 7-10 is explained by using the system of FIG. 1. The method includes performing, in 501, a first call packing. The first call packing includes receiving a first data collection and a second data collection, both of a common first data type. The first call packing is performed by the timeslot interchange 200 that receives the first and second data collections within an SDF frame. An example of each of the first and the second data collections include an E1 communication. An example of the first type includes an E1 type. Each from the first and second data collections include m sets of data, where m is an integer. As an example, m is equal to 4 when a data collection is an E1 communication. In the example, the E1 communication occupies 4 TVT0.5s in an SDF frame.

To perform the first call packing, a program stored within the connection memory 206 is executed to instruct the data buffer 204 to output p sets of data from the first data collection, where p is an integer less than m. As an example, p is (m−1). Hence, the size of each of the first and second data collections is greater than the size of a set of timeslots within the SDF frame. At least one data set from each of the first and second data collections will not fit within a corresponding set of timeslots within the SDF frame and instead constitutes an overflow set of data.

The p sets of data of the first data collection are output to fill a first set of p timeslots within an SDF frame output from the data buffer 204. Moreover, to perform the first call packing, the program is executed to instruct the data buffer 204 to output p sets of data from the second data collection. The p sets of data of the second data collection are output to fill a second set of p timeslots within the SDF frame. Furthermore, to perform the first call packing, the program is executed to instruct the data buffer 204 to output an mth set, which is an overflow set, of data from the first data collection. The mth set of data of the first data collection is output to partially fill, alternatively referred to as load, a third set of p timeslots within the SDF frame which represent an overflow set of timeslots. Additionally, to perform the first call packing, the program is executed to instruct the data buffer 204 to output an mth set, which is an overflow set, of data from the second data collection. The mth set of data of the second data collection is output to partially fill the third set of p timeslots within the SDF frame. The third set of p timeslots represents an overflow set as the third set receives overflow data sets from the first and second data collections. The overflow sets of the first and second data collections load, but do not fill the third set of p timeslots in the SDF frame.

As an example, in the 96×9 SDF frame shown in FIG. 6, to perform the first call packing, the program is executed to instruct data buffer 204 to output three TVT0.5s of a first E1 communication. The three TVT0.5s of the first E1 communication are output to fill a first set of three columns, such as columns n, n+32, and n+64, within the 96×9 SDF frame. Moreover, in the example, to perform the first call packing, the program is executed to instruct data buffer 204 to output three TVT0.5s of a second E1 communication. The three TVT0.5s of the second E1 communication are output to fill a second set of three columns, such as columns n, n+32, and n+64, within the 96×9 SDF frame. Furthermore, in the example, to perform the first call packing, the program is executed to instruct data buffer 204 to output a fourth TVT0.5 of the first E1 communication and a fourth TVT0.5 of the second E1 communication to partially fill a third set of three columns, such as columns n, n+32, and n+64, within the 96×9 SDF frame. In the example, the third set of three columns is partially filled because two of the three columns are occupied by the fourth TVT0.5s from the first and second E1 communications. In an alternative embodiment, the first call packing is performed with at least two E1 communications and any number of DS1 communications. The first call packing can be performed within one or in multiple frames.

The method further includes determining, in 505, whether a connection is one from the first type and a second type. The determination is made by the execution of the program stored within the connection memory 206 of the timeslot interchange 200. The connection is a connection made with any of the input side interfaces 10A-10N. An example of the first type of connection is an E1 connection and an example of the second type of connection is a DS1 connection.

Regardless of whether the connection is of the first or the second type, the program is executed to determine, in 509 and 513, whether the connection is one of a broadcast and a non-broadcast connection. For the broadcast connection, at least two routes are developed and each route passes through a different output side timeslot interchange 144, 145, or 146.

As an example, if the connection is an E1 connection and a broadcast connection, referred to as an E1 broadcast connection, eight columns are occupied, where four of the eight columns are occupied in a 96×9 SDF frame in the output side timeslot interchange 144 and the remaining four columns are occupied in a 96×9 SDF frame in the output side timeslot interchange 145. As another example, if the connection is a DS1 connection and a broadcast connection, referred to as a DS1 broadcast connection, six columns are occupied, where three of the six columns are occupied in a 96×9 SDF frame in the output side timeslot interchange 145 and the remaining three columns are occupied in a 96×9 SDF frame in the output side timeslot interchange 146. In an alternative embodiment, for the broadcast connection, at least two routes are developed and each route passes through the same output side timeslot interchange. As an example, if the connection is an E1 broadcast connection, eight columns are occupied, where four of the eight columns are occupied in a 96×9 SDF frame in the output side timeslot interchange 144 and the remaining four columns are also occupied in the 96×9 SDF frame in the output side timeslot interchange 144.

If the connection is of the first type and a broadcast connection, referred to as a first broadcast connection, the program stored within the connection memory 206 of the timeslot interchange 200 is executed to determine, in 517, whether a capacity of the timeslot interchange 200 to route the first broadcast connection is exceeded. If the connection is of the first type and a non-broadcast connection, referred to as a first non-broadcast connection, the program is executed to determine, in 521, whether a capacity of the timeslot interchange 200 to route the first non-broadcast connection is exceeded. If the connection is of the second type and a broadcast connection, referred to as a second broadcast connection, the program is executed to determine, in 525, whether a capacity of the timeslot interchange 200 to route the second broadcast connection is exceeded. If the connection is of the second type and a non-broadcast connection, referred to as a second non-broadcast connection, the program is executed to determine, in 529, whether a capacity of the timeslot interchange 200 to route the connection is exceeded.

As an example, if the timeslot interchange 200 supports one 96×9 SDF frame, a capacity of the timeslot interchange 200 to route an E1 broadcast connection is exceeded if at least eight columns of the 96×9 SDF frame are not empty. As another example, if the timeslot interchange 200 supports one 96×9 SDF frame, a capacity of the timeslot interchange 200 to route an E1 and a non-broadcast connection, referred to as an E1 non-broadcast connection, is exceeded if at least four columns of the 96×9 SDF frame are not empty. As yet another example, if the timeslot interchange 200 supports one 96×9 SDF frame, a capacity of the timeslot interchange 200 to route a DS1 broadcast connection is exceeded if at least six columns of the 96×9 SDF frame are not empty. As another example, if the timeslot interchange 200 supports one 96×9 SDF frame, a capacity of the timeslot interchange 200 to route a DS1 and a non-broadcast connection, referred to as a DS1 non-broadcast connection, is exceeded if at least three columns of the 96×9 SDF frame are not empty.

If the capacity to route the first broadcast connection is not exceeded at the timeslot interchange 200, the program is executed to determine, in 533, to route the first broadcast connection through the timeslot interchange 200. Otherwise, the first broadcast connection is rejected in 537 and will not be routed through the timeslot interchange 200. If the capacity to route the first non-broadcast connection is not exceeded the timeslot interchange 200, the program is executed to determine, in 541, to route the first non-broadcast connection through the timeslot interchange 200. Otherwise, the first non-broadcast connection is rejected in 537 and will not be routed through the timeslot interchange 200. If the capacity to route the second broadcast connection is not exceeded at the timeslot interchange 200, the program is executed to determine, in 545, to route the second broadcast connection through the timeslot interchange 200. Otherwise, the second broadcast connection is rejected in 549 and will not be routed through the timeslot interchange 200. If the capacity to route the second non-broadcast connection is not exceeded at the timeslot interchange 200, the program is executed to determine, in 553, to route the second non-broadcast connection through the timeslot interchange 200. Otherwise, the second non-broadcast connection is rejected in 549 and will not be routed through the timeslot interchange 200.

The method further includes performing, in 557, a second call packing after deletion of a connection. The second call packing includes receiving at least a third, a fourth, a fifth, and a sixth data collection of the first type, where each of the third, fourth, fifth, and sixth data collections include m sets of data. For example, the second call packing includes receiving four E1 connections, where each of the E1 connections include 4 TVT0.5s. The second call packing is performed by the timeslot interchange 200 that receives the third, fourth, fifth, and sixth data collections within an SDF frame.

To perform the second call packing, the program stored within the connection memory 206 of the timeslot interchange 200 is executed to instruct data buffer 204 to output p sets of data from the third data collection. The p sets of data from the third data collection are output to fill a fourth set of p timeslots. Moreover, to perform the second call packing, the program is executed to instruct data buffer 204 to output p sets of data from the fourth data collection. The p sets of data from the fourth data collection are output to fill a fifth set of p timeslots. Furthermore, to perform the second call packing, the program is executed to instruct data buffer 204 to output p sets of data from the fifth data collection. The p sets of data from the fifth data collection are output to fill a sixth set of p timeslots. Additionally, to perform the second call packing, the program is executed to instruct data buffer 204 to output p sets of data from the sixth data collection. The p sets of data from the sixth data collection are output to fill a seventh set of p timeslots. Additionally, to perform the second call packing, the program is executed to instruct data buffer 204 to output an mth set of data from the third data collection, an mth set of data from the fourth data collection, an mth set of data from the fifth data collection, and an mth set of data from the sixth data collection. The mth sets of data from the third, fourth and fifth data collections are output to fill an eighth set of p timeslots. The mth set of data from the sixth data collection is output to load a ninth set of p timeslots. The mth sets of data from the third, fourth, fifth, and sixth data collections are overflow sets, and the eighth and ninth sets of p timeslots are overflow timeslots.

For example, in the 96×9 SDF frame shown in FIG. 6, to perform the second call packing, the program is executed to instruct data buffer 204 to output three TVT0.5s of a first E1 communication. The three TVT0.5s of the first E1 communication are output to fill a first set of three columns, such as columns n, n+32, and n+64, within the 96×9 SDF frame. Moreover, in the example, to perform the second call packing, the program is executed to instruct data buffer 204 to output three TVT0.5s of a second E1 communication. The three TVT0.5s of the second E1 communication are output to fill a second set of three columns, such as columns n, n+32, and n+64, within the 96×9 SDF frame. Furthermore, in the example, to perform the second call packing, the program is executed to instruct data buffer 204 to output three TVT0.5s of a third E1 communication. The three TVT0.5s of the third E1 communication are output to fill a third set of three columns, such as columns n, n+32, and n+64, within the 96×9 SDF frame. Additionally, in the example, to perform the second call packing, the program is executed to instruct data buffer 204 to output three TVT0.5s of a fourth E1 communication. The three TVT0.5s of the fourth E1 communication are output to fill a fourth set of three columns, such as columns n, n+32, and n+64, within the 96×9 SDF frame.

Moreover, in the example, to perform the second call packing, the program is executed to instruct data buffer 204 to output a fourth TVT0.5 of the first E1 communication, a fourth TVT0.5 of the second E1 communication, and a fourth TVT0.5 of the third E1 communication. The fourth TVT0.5s of the first, second, and third E1 communications are output to fill a fifth set of three columns, such as columns n, n+32, and n+64, within the 96×9 SDF frame. Furthermore, in the example, to perform the second call packing, the program is executed to instruct data buffer 204 to output a fourth TVT0.5 of the fourth E1 communication. The fourth TVT0.5 of the fourth E1 communication is output to partially load a sixth set of three columns, such as columns n, n+32, and n+64, within the 96×9 SDF frame. The sixth set is partially loaded because one of the three columns is occupied. The second call packing can be performed within one or in multiple SDF frames.

In an alternative embodiment, if the fourth data collection is deleted after receiving the third, fourth, fifth, and sixth data collections, the method includes removing the mth set of data of the fourth data collection from the eighth set of p timeslots and instead filling the time slot from which the mth set is removed with an mth set of data of the sixth data collection. The connection of the third data collection can be deleted by a customer or by the system shown in FIG. 3.

The method also includes determining, in 561, whether p sets of data or an mth set of data from the first data collection is to be transported. If p sets of data are to be transported, the method includes determining, in 565, whether a first route via at least two timeslot interchanges, such as the input side timeslot interchange 104 and the output side timeslot interchange 144, and at least one space switch, such as the space switch 120, for transporting p sets of data from the first data collection is blocked. The determination as to whether a route exists through a timeslot interchange is made by executing a program stored within a connection memory of that timeslot interchange and as to whether a route exists through a space switch is made by executing a program stored within a connection memory of that space switch.

The method further includes routing, in 569, the p sets of data from the first data collection via the at least two timeslot interchanges and at least one space switch if the first route is unblocked. The method also includes selecting, in 573, p timeslots of a second route different than the first route if the first route is blocked. As an example, if execution of the program stored within the connection memory 310 of the space switch 300 determines that the space switch 300 cannot transport three TVT0.5s of an E1 connection within columns n, n+32, n+64 of a 96×9 SDF frame at a time corresponding to the columns n, n+32, n+64, the program is executed to select a different time within which the space switch 300 can transport the three TVT0.5s. As another example, if execution of a program within the connection memory 310 of the space switch 300 determines that the space switch 300 cannot transport three TVT0.5s of a DS1 connection within columns n, n+32, n+64 of a 96×9 SDF frame, the space switch at a time corresponding to the columns n, n+32, n+64, the program is executed to select a different time within which the space switch 300 can transport the three TVT0.5s. In an alternative embodiment, the second route is selected prior to removing the first route. In yet another alternative embodiment, the second route is selected after removing the first route.

The second route is selected by performing a sequential search. The sequential search for the second route is performed by executing the program stored within the connection memory 310 of the space switch 300. The sequential search for the second route is performed by identifying, in a consecutive fashion, within the space switch 300, an empty time level. For example, the sequential search checks whether a time level, within the space switch 300, corresponding to columns n, n+32, and n+64 within a 96×9 frame output from the input side timeslot interchange 101 to the space switch, is empty. In the example, if the time level corresponding to columns n, n+32, and n+64 is not empty, the sequential search continues by checking whether a time level corresponding to columns n+1, n+33, and n+65 within the 96×9 frame output from the input side timeslot interchange 101, is empty.

Alternatively, the second route is selected by performing a uniform search for the second route. The uniform search for the second route is performed by executing the program stored within the connection memory 310 of the space switch 300. The uniform search is performed by determining whether a first time level has less load than loads of remaining time levels within the space switch 300. For example, the uniform search checks whether a time level, within the space switch 300, corresponding to columns n, n+32, and n+64 within a 96×9 SDF frame output from the input side timeslot interchange 104 to the space switch 300, has a lower number of TVT0.5s than a number of TVT0.5s within remaining time levels of the space switch 300. The uniform search also determines whether the first time level is empty if the first time level has less load than loads of the remaining time levels within space switch.

If an mth set of data from the first data collection is to be transported, the method includes determining, in 577, whether a third route via at least two timeslot interchanges, such as the input side timeslot interchange 104 and the output side timeslot interchange 144, and at least one space switch, such as the space switch 300, for transporting the mth set of data from the first data collection is blocked. The determination as to whether a route exists through a timeslot interchange is made by executing a program stored within a connection memory of that timeslot interchange and as to whether a route exists through a space switch is made by executing a program stored within a connection memory of that space switch. The method further includes routing, in 581, the mth set of data from the first data collection via the at least two timeslot interchanges and at least one space switch if the first route is unblocked.

The method also includes selecting, in 585, a timeslot of a fourth route different than the third route if the third route is blocked. As an example, if execution of the program stored within the connection memory 310 of the space switch 300 determines that the space switch 300 cannot transport a TVT0.5 of an E1 connection, within a column n of a 96×9 SDF frame, at a time corresponding to the column n, the program is executed to search for a different time within which the space switch 300 can transport the TVT0.5. In an alternative embodiment, the fourth route is selected prior to removing the third route. In yet another alternative embodiment, the fourth route is selected after removing the third route. If the timeslot of the fourth route is unavailable, the program is executed to select a time level, such as for instance, columns n, n+32, and n+64, and the mth set of data is routed at that time level.

The fourth route is selected by performing a sequential search. The sequential search for the fourth route is performed by the program stored within the connection memory 310 of the space switch 300. The sequential search for the fourth route is performed by identifying, in a consecutive fashion, within the space switch 300, an empty time. For example, the sequential search checks whether a time, within the space switch 300, corresponding to a column n within a 96×9 SDF frame output from the input side timeslot interchange 104 to the space switch 300, is empty. In the example, if the time corresponding to the column n is not empty, the sequential search continues by checking whether a time corresponding to a column n+1 within the 96×9 SDF frame output from the input side timeslot interchange 101, is empty.

Alternatively, the fourth route is selected by performing a uniform search for the fourth route. The uniform search for the fourth route is performed by the program stored within the connection memory 310 of the space switch 300. The uniform search is performed by determining whether a first time has less load than loads of remaining times within the space switch 300. For example, the uniform search checks whether a time, within the space switch 300, corresponding to a column n within a 96×9 SDF frame output from the input side timeslot interchange 104 to the space switch 300, has a lower number of TVT0.5s than a number of TVT0.5 within remaining times of the space switch 300. The uniform search also determines whether the first time is empty if the first time has less load than loads of the remaining times within space switch.

It is noted that alternatively, in the sequential and the uniform searches mentioned above, reserved timeslots, such as, for instance, columns 31, 63, and 95 within a 96×9 SDF frame, are not searched. It is also noted that when sets of data are to be communicated via the timeslot interchange 200, the program stored within the connection memory 206 of the timeslot interchange 200 can also perform the sequential searches and the uniform searches, described above, in a similar manner as that performed by the program stored within the connection memory 310 of the space switch 300.

The method further includes receiving, in 589, a seventh data collection. The timeslot interchange 200 receives the seventh data collection within an SDF frame. The program stored within the connection memory 206 of the timeslot interchange 200 is executed to determine, in 593, whether the seventh data collection is one from the first type, such as an E1, and a second type, such as a DS1, that is different than the first type or alternatively, is of a third type, such as, for instance, a DS3, that is different than the first and the second types. A DS3 connection occupies the modified SDF frame shown in FIG. 5. The method includes initializing, in 597, to perform the first call packing in a first SDF frame manipulated by an uppermost timeslot interchange, such as the input side timeslot interchange 104 and the output side timeslot interchange 144, in the system shown in FIG. 2, and then performing the first call packing in a second SDF frame manipulated by a lowermost timeslot interchange, such as input side timeslot interchange 106 and the output side timeslot interchange 146, if the third data collection is one from the first type and the second type. The method also includes initializing, in 601, to perform the first call packing in the second SDF frame within the lowermost timeslot interchange and then performing the first call packing in the first SDF frame if the third data collection is of the third type. Alternatively, the second call packing can be performed either instead of or in addition to the first call packing performed within 597 and 601.

The method further includes deleting, in 605, a first connection, such as a DS1 connection or three TVT0.5s of an E1 connection, from the first SDF frame, where the first connection occupies p timeslots in the first SDF frame. The deletion in 605 is performed by a customer or by the system shown in FIG. 3.

The program stored within the connection memory 310 of the space switch 300 instructs to move, in 609, a second connection, such as a DS1 connection or three TVT0.5s of an E1 connection, from the second SDF frame to the first SDF frame. The second connection occupies p timeslots in the second SDF frame. The space switch 300 moves the second connection by outputting the second connection into addresses corresponding to p timeslots within the first SDF frame. The space switch 300 moves the second connection into timeslots that are within the first SDF frame and that correspond to timeslots within the second SDF frame. For example, if the second connection occupies columns n, n+32, and n+64, where n=3, within the second SDF frame, the second connection is moved to columns n, n+32, and n+64, where n=3, within the first SDF frame. In an alternative embodiment, the moving in 609 can be performed regardless of whether the first connection is deleted as long as there are p empty timeslots in an SDF frame to which a connection is moved. In yet another alternative embodiment, the moving in 609 can be performed if the second SDF frame has less load, such as for instance, less TVT0.5s, than the first SDF frame before the deletion from the first connection.

It is noted that data collections that are input to one input side timeslot interchange are output from one output side timeslot interchange and the data collections can be efficiently routed between the input side and the output side timeslot interchanges by performing the first or the second call packing. For example, if two E1 communications are input to one of input side timeslot interchanges 104-106, both the E1 communications are also output from one of output side timeslot interchanges 144-146. In the example, both the E1 communications are output from one of output side timeslot interchanges 144-146 because mth sets of data of the E1 communications share the same TVT1.5s through the space switch 120.

It is also noted that data collections that are input to separate input side timeslot interchanges can be output from the same output side timeslot interchange as long as a capacity of any one of the input side timeslot interchanges or of the output side timeslot interchange is not exceeded. For example, if a first E1 communication is input to the input side timeslot interchange 104 and a second E1 communication is input to the input side timeslot interchange 106, both the E1 communications can be output from the output side timeslot interchange 144 as long as a capacity of one of the input side timeslot interchange 104, the input side timeslot interchange 106, and the output side timeslot interchange 144, is not exceeded. In the case where the capacity is not exceeded, generally, it is not efficient to perform the first or second call packing because the data collections do not terminate on the same input side timeslot interchange and cannot share the same TVT1.5 through the space switch 120. Moreover, in the case where the capacity is not exceeded, timeslots within the input side timeslot interchanges and the output side timeslot interchange are not efficiently utilized because the first or the second call packing are not performed. Therefore, additional timeslots that are within the input side timeslot interchanges and the output side timeslot interchange, and that are used for broadcast connections are used to route non-broadcast connections. Thus, a tradeoff exists between an amount of timeslots available for use, by broadcast connections, within the 96×9 SDF frame and a number of connections that are not packed using the first or the second call packing. If the capacity of any one of the input side timeslot interchanges or of the output side timeslot interchange is exceeded, the data collections are blocked. Because of the limited capacity, it is efficient to plan usage of the system for switching multi-rate communications such that the first or the second call packing can be performed to prevent such blocking.

It is further noted that data collections that are input to the same input side timeslot interchange can be output from different output side timeslot interchanges as long as a capacity of the input side timeslot interchange or any one of the output side timeslot interchanges is not exceeded. Similar principles described above with respect to data collections that are input to separate input side timeslot interchanges and output from the same output side timeslot interchange can be applied to data collections that are input to the same input side timeslot interchange and output from different output side timeslot interchanges. For example, if the capacity of the input side timeslot interchange or any one of the output side timeslot interchanges is exceeded, the data collections are blocked.

It is noted that although FIGS. 7-10 show a consecutive order in which the method for switching multi-rate communications is executed, in alternative embodiments, the order can change. For example, 501 can be performed between 549 and 557. It is further noted that the programs stored within the space switch 300 and the timeslot interchange 200 are executed by the control and preprocessing subsection 90. It is also noted that the systems and methods for switching multi-rate communications can be utilized in optical networks, such as optical cross-connects, and in optical-electrical networks, such as optical-electrical cross-connects.

Unlike some typical network systems in which all nodes utilize the same type of communications, technical effects of the herein described systems and methods include routing different types of communications. Moreover, the technical effects include minimizing bandwidth of the system illustrated in FIG. 1 by efficiently packing communications entering into the system, and preventing blocked communications.

While the invention has been described in terms of various specific embodiments, those skilled in the art will recognize that the invention can be practiced with modification within the spirit and scope of the claims.

What is claimed is:

1. A method for switching multi-rate communications within a communications format comprised of frames, each frame having multiple timeslots, using a network system that includes a first timeslot interchange and a second timeslot interchange, where the first timeslot interchange outputs a first system data format (SDF) frame and the second timeslot interchange outputs a second SDF frame, the method comprising:

obtaining a first data collection comprising m sets of data;
allocating p timeslots from a frame to the first data collection, where p is less than m;
providing at least one overflow timeslot from the frame for use with different data collections;
filling the p timeslots with p sets of data from the m sets of data within the first data collection;
loading the at least one overflow timeslot with at least one overflow set of data from the m sets of data within the first data collection; and
initializing to perform a first call packing in the second SDF frame and then performing the first call packing in the first SDF frame if a third data collection is of a third type that is different than the first type and a second type.

2. A method in accordance with claim 1 further comprising:
filling a second set of p timeslots with p sets of data from a second data collection of the first type, wherein the second data collection includes m sets of data.

3. A method in accordance with claim 1 further comprising:
loading the at least one overflow timeslot with at least one overflow set of data from a second data collection of the first type, wherein the second data collection includes m sets of data.

4. A method in accordance with claim 1 further comprising:
filling a second set of p timeslots with p sets of data from a second data collection, wherein the second data collection is of a second type that is different than the first type and the second data collection includes p sets of data.

5. A method in accordance with claim 1 further comprising:
filling a second set of p timeslots with p sets of data from a second data collection, wherein the second data collection is of a second type that is different than the first type, wherein the second type is a DS1 type; and
filling a second set of p timeslots with p sets of data from the second data collection.

6. A method in accordance with claim 1 wherein a network system includes a number of timeslot interchanges, said method further comprising determining whether a capacity of the timeslot interchanges to support a number of connections of the first type and of a second type is exceeded if a connection is routed via the timeslot interchanges.

7. A method in accordance with claim 1 wherein a network system includes at least two timeslot interchanges coupled to at least one space switch, different first and second routes exist via the at least two timeslot interchanges and the at least one space switch, said method further comprising:
routing the p sets of data of the first data collection via the first route if the first route is unblocked; and
selecting p timeslots of the second route if the first route is blocked.

8. A method in accordance with claim 1 wherein a network system includes at least two timeslot interchanges coupled to at least one space switch, different first route and second routes exist via the at least two timeslot interchanges and the at least one space switch, said method further comprising:
selecting p timeslots of the second route if the first route is blocked; and
performing a sequential search for the second route by identifying, in a consecutive fashion within the at least two timeslot interchanges, the p timeslots.

9. A method in accordance with claim 1 wherein a network system includes at least two timeslot interchanges coupled to at least one space switch, a first route and a second route exists via the at least two timeslot interchanges and the at least one space switch, and the first route is different than the second route, said method further comprising:
selecting p timeslots of a second route different than a first route via at least two timeslot interchanges and at least one space switch for transporting the p sets of data from the first data collection if the first route is blocked; and
performing a uniform search for the second route by determining whether the p timeslots have less load than loads of remaining timeslots within the at least two timeslot interchanges.

10. A method in accordance with claim 1 wherein a network system includes at least two timeslot interchanges coupled to at least one space switch, different first route and second routes exist via the at least two timeslot interchanges and the at least one space switch, said method further comprising selecting an nth timeslot of the second route if the first route is blocked.

11. A method in accordance with claim 1 wherein a network system includes at least two timeslot interchanges coupled to at least one space switch, different first route and second routes exist via the at least two timeslot interchanges and the at least one space switch, said method further comprising:
selecting an nth timeslot of the second route if the first route is blocked; and
performing a sequential search for the second route by identifying, in a consecutive fashion within the at least two timeslot interchanges, the nth timeslot.

12. A method in accordance with claim 1 wherein a network system includes at least two timeslot interchanges coupled to at least one space switch, different first route and second routes exist via the at least two timeslot interchanges and the at least one space switch, said method further comprising:
selecting an nth timeslot of the second route if the first route is blocked; and
performing a uniform search for the second route by determining whether the nth timeslot has less load than loads of remaining timeslots within the at least two timeslot interchanges.

13. A method for switching multi-rate communications, wherein a network system includes a first and a second timeslot interchange, and the first timeslot interchange outputs a first system data format (SDF) frame and the second timeslot interchange outputs a second SDF frame, said method comprising:
filling a first set of p timeslots with p sets of data from a first data collection of a first type, wherein the first data collection includes m sets of data and p is less than m;
loading at least one overflow timeslot with at least one overflow set of data from the first data collection, wherein the overflow set of data exceeds a size of the first set of p time slots, and
initializing to perform a first call packing in the second SDF frame and then performing the first call packing in the first SDF frame if a second data collection is of a DS3 type.

14. A method for switching multi-rate communications, wherein a network system includes a first and a second timeslot interchange, and the first timeslot interchange outputs a first system data format (SDF) frame and the second timeslot interchange outputs a second SDF frame, said method comprising:
filling a first set of p timeslots with p sets of data from a first data collection of a first type, wherein the first data collection includes m sets of data and p is less than m;
loading at least one overflow timeslot with at least one overflow set of data from the first data collection, wherein the overflow set of data exceeds a size of the first set of p timeslots,
deleting a first connection from the first SDF frame, wherein the first connection occupies p timeslots in the first SDF frame; and
moving a second connection from the second SDF frame to the first SDF frame, wherein the second connection occupies p timeslots in the second SDF frame.

15. A method in accordance with claim 1 further comprising:
determining whether a connection is one of the first type and a second type; and searching for one of (m−1) timeslots and (m−3) timeslots if the connection is of the first type.

16. A method for switching multi-rate communications using a network system that includes a first and a second timeslot interchange, where the first timeslot interchange outputs a first system data format (SDF) frame and the second timeslot interchange outputs a second SDF frame, said method comprising:
   obtaining first, second and third data collections of a first data type, each of the first, second, and third data collections comprising m sets of data;
   allocating p timeslots, from frames of a communication format, to each of the first, second and third data collections, where p is less than m;
   providing at least one overflow timeslot, from the frames of the communication format, for use with the first, second, and third data collections;
   filling first, second, and third sets of p timeslots with p sets of data from the first, second, and third data collections, respectively;
   loading overflow timeslots with an mth set of data of the first data collection, an mth set of data of the second data collection, and an mth set of data of the third data collection; and
   initializing to perform a first call packing in a second SDF frame and then performing the first call packing in a first SDF frame if the third data collection is of a third type that is different than the first type and a second type.

17. A method in accordance with claim 16 wherein a network system includes at least two timeslot interchanges coupled to at least one space switch, a first route and a second route exists via the at least two timeslot interchanges and the at least one space switch, and the first route is different than the second route, said method further comprising:
   routing the p sets of data of the first data collection via the first route if the first route is unblocked; and
   selecting p timeslots of the second route different than the first route if the first route is blocked.

18. A method in accordance with claim 16 wherein a network system includes at least two timeslot interchanges coupled to at least one space switch, a first route and a second route exists via the at least two timeslot interchanges and the at least one space switch, and the first route is different than the second route, said method further comprising:
   selecting p timeslots within the second route for transporting the p sets of data from the first data collection if the first route is blocked; and
   performing a sequential search for the second route by identifying, in a consecutive fashion within the at least two timeslot interchanges, the p timeslots within the second route.

19. A method in accordance with claim 16 wherein a network system includes at least two timeslot interchanges coupled to at least one space switch, a first route and a second route exists via the at least two timeslot interchanges and the at least one space switch, and the first route is different than the second route, said method further comprising:
   selecting an nth timeslot of the second route if the first route is blocked; and
   performing a uniform search for the second route by determining whether the nth timeslot has less load than loads of remaining timeslots within the at least two timeslot interchanges.

* * * * *